United States Patent
He et al.

(10) Patent No.: US 9,699,063 B2
(45) Date of Patent: Jul. 4, 2017

(54) TRANSITIONING A ROUTING SWITCH DEVICE BETWEEN NETWORK PROTOCOLS

(71) Applicant: International Business Machines Corporation, Armonk, NY (US)

(72) Inventors: Jing He, Wuxi (CN); Yuan Li, Changzhou (CN); Yi bo Song, Wuxi (CN); Liang Yang, Wellington (NZ)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 14/711,932

(22) Filed: May 14, 2015

(65) Prior Publication Data

US 2015/0350056 A1    Dec. 3, 2015

(30) Foreign Application Priority Data

May 28, 2014    (CN) .......................... 2014 1 0230463

(51) Int. Cl.
*H04L 12/28*      (2006.01)
*H04L 12/751*      (2013.01)
*H04L 12/931*      (2013.01)
*H04L 12/721*      (2013.01)

(52) U.S. Cl.
CPC .............. *H04L 45/02* (2013.01); *H04L 49/35* (2013.01); *H04L 49/70* (2013.01); *H04L 45/38* (2013.01)

(58) Field of Classification Search
CPC . H04L 41/0654; H04L 41/0672; H04L 41/38; H04L 49/35; H04L 49/70
See application file for complete search history.

(56) References Cited

U.S. PATENT DOCUMENTS

| | | | |
|---|---|---|---|
| 2013/0308651 A1 | 11/2013 | Ding et al. | |
| 2014/0040459 A1 | 2/2014 | Agrawal et al. | |
| 2015/0326425 A1* | 11/2015 | Natarajan | H04L 41/0672 370/216 |

FOREIGN PATENT DOCUMENTS

| | | |
|---|---|---|
| CN | 102946365 A | 2/2013 |
| EP | 2544409 A1 | 1/2013 |

OTHER PUBLICATIONS

ONF (open network foundation, open flow switch specification, version 1.3.3, Sep. 27, 2013).*
Farias et al., "Integrating Legacy Forwarding Environment to OpenFlow/SDN Control Plane", Copyright 2013 IEICE, Sep. 25-27, 2013, 2013 15th Asia-Pacific, Network Operations and Management Symposium (APNOMS), 3 pages.

(Continued)

*Primary Examiner* — Maharishi Khirodhar
(74) *Attorney, Agent, or Firm* — Aaron N. Pontikos; Isaac J. Gooshaw (57) ABSTRACT

The present disclosure provides a method and device for use by a routing switch device. In response to a determination to switch the routing switch device to switch from a conventional mode to an OpenFlow mode the following operations are performed. Table items of a forwarding table in the conventional mode are converted to flow table items in the OpenFlow mode. The converted flow table items are stored in a flow table of the routing switch device. Processing a received data packet based, at least in part, on the converted flow table items stored in the flow table.

20 Claims, 3 Drawing Sheets

(56) References Cited

OTHER PUBLICATIONS

Farias et al., "LegacyFlow: Bringing OpenFlow to Legacy Network Environments", provided in Search report dated 03/36/2014.
Naous et al., "Implementing an OpenFlow Switch on the NetFPGA platform", ANCS '08, Nov. 6-7, 2008, San Jose, CA, USA, Copyright 2008, ACM 978-1-60558-346-4/08/0011, 9 pages.
"OpenFlow Implementation for Data Center Blade Server Switch", Nov. 21, 2013, © 2013 Calsoft Labs, pp. 1-2.
China Patent Application No. 201410230463.7 entitled "Routing Switch Device", filed May 28, 2014.

\* cited by examiner

TRANSITIONING A ROUTING SWITCH DEVICE BETWEEN NETWORK PROTOCOLS

BACKGROUND OF THE INVENTION

The present disclosure relates to the network technology, and more specifically, to a method and device for use by a routing switch device.

A routing switch device supporting the OpenFlow protocol can operate in the OpenFlow mode or a conventional mode according to its configuration and its connection state with the controller. The conventional mode includes a standalone mode and a fail standalone mode. In the fail standalone mode, a routing switch device supporting the OpenFlow protocol has been activated to be in the OpenFlow mode, but has lost connection with the controller.

SUMMARY

According to one embodiment of the present disclosure, there is provided a method for use by a routing switch device, comprising: responsive to a determination to switch the routing switch device from a conventional mode to an OpenFlow mode: converting, by one or more processors, table items of a forwarding table in the conventional mode to flow table items in the OpenFlow mode; storing, by the one or more processors, the converted flow table items in a flow table of the routing switch device; and in response to receiving a data packet, processing, by the one or more processors, the data packet based, at least in part, on the converted flow table items stored in the flow table.

According to another embodiment of the present disclosure, there is provided a device for use by a routing switch device, comprising: a conversion module configured to respond to a routing switch device being switched from a conventional mode to an OpenFlow mode by converting table items of a forwarding table in the conventional mode to flow table items in the OpenFlow mode; a storage module configured to store converted flow table items in a flow table of the routing switch device; and a data packet processing module configured to respond to a reception of a data packet by processing the data packet based, at least in part, on the converted flow table items stored in the flow table.

DETAILED DESCRIPTION

According to the OpenFlow protocol, one approach to deal with a lost connection is to delete all the flow table items and to turn on the conventional forwarding function of the routing switch device to perform forwarding according to the conventional forwarding table. Table 1 illustrates the characteristics of respective modes.

TABLE 1

|  | Conventional mode | OpenFlow mode |
|---|---|---|
| Scenario 1 | Standalone mode: not activate the OpenFlow mode | Activate the OpenFlow mode and establish connection with the controller |
| Scenario 2 | Fail standalone mode: activate the OpenFlow mode and lose connection with the controller |  |

Scenario 1 in Table 1 indicates the change from the standalone mode to the OpenFlow mode. In some solutions, once the routing switch device switches from the standalone mode to the OpenFlow mode, the function of the conventional Layer 2 or Layer 3 (L2/L3) is turned off, and the corresponding forwarding table (including FDB, the routing table, etc) is deleted. Before the routing switch device establishes connection with the controller, all the inputted data packets are discarded. After the routing switch device establishes a connection with the controller, the controller can specify a default process rule for a data packet that does not match to a flow table item. In general, the default process rule usually requests the routing switch device to forward the unknown data packet to the controller or to discard the unknown data packet.

Scenario 2 in Table 1 indicates the change from a fail standalone mode to the OpenFlow mode. In some solutions, once the routing switch device establishes a connection with the controller again, the routing switch device changes back to the OpenFlow mode from the fail standalone mode. At this time, the original flow table items have been deleted. As such, the routing switch device needs to wait for adding a flow table item until the protocol converges in the controller. However, protocol convergence speed is usually low. Before the protocol converges, only the above mentioned default process rule exists. The action of the default process rule is to transmit all the packets that do not match the flow table items to the controller. However, a packet would be soft-forwarded by the central processing unit (CPU) of a switch when being sent to the controller. This channel is very narrow itself. The forwarding port of a switch can reach 1 Gbps in line rate, but the speed with soft-forwarding is only in the order of Mbps at most. Therefore, packets above the order of Mbps are discarded. As a result, if a protocol control packet is mixed in data flow, it may be discarded, which influences the protocol convergence speed in the controller. In addition, soft-forwarding a packet by CPU often consumes a lot of CPU resources, causing the CPU to run more slowly. Moreover, many of the data packets that are sent to the controller require computation, which consumes the resources of the controller, and such activity does not increase protocol computation (since the controller performs protocol convergence based on the protocol control packets).

One embodiment of the present disclosure provides a switch method included in a switch procedure of a routing switch device for switching the routing switch device from a conventional mode to the OpenFlow mode. In one embodiment, the method and the device for use by a routing switch device provided by the present disclosure enables the routing switch device to i) switch seamlessly from a conventional mode to the OpenFlow mode, and ii) reduce consumption of CPU resources of the routing switch device.

A number of embodiments will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
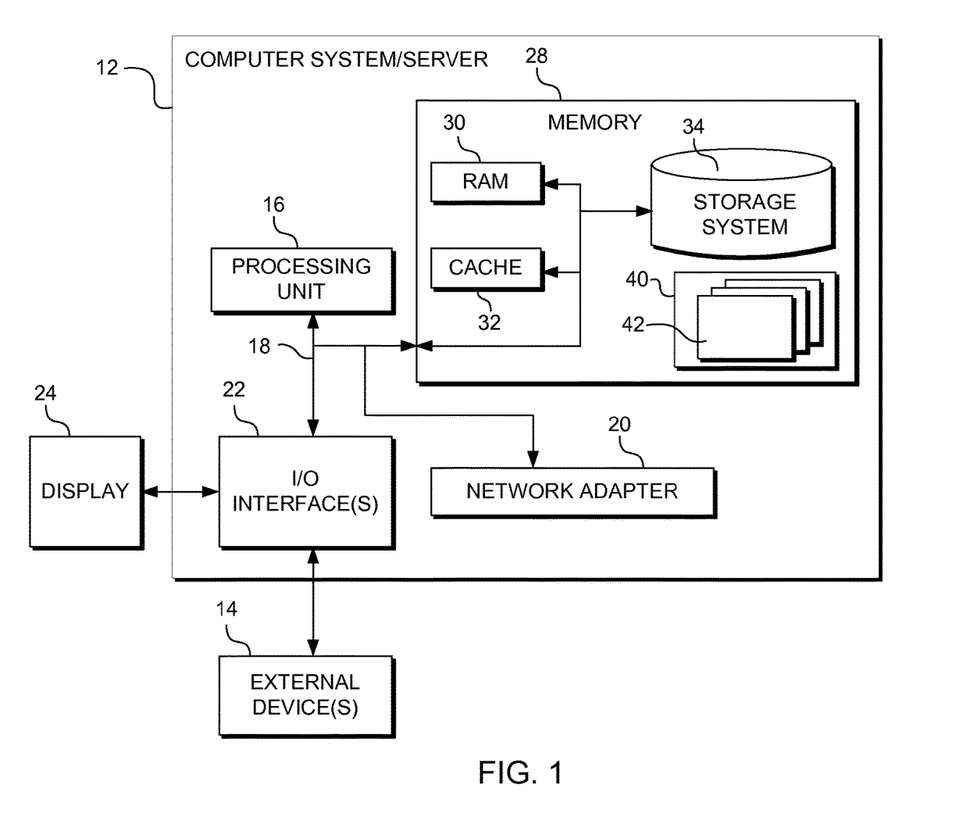
FIG. 1 shows an exemplary computer system/server 12, in accordance with an exemplary embodiment of the present invention.

Referring to FIG. 1, an exemplary computer system/server 12 is shown that is applicable to implement an embodiment of the present disclosure. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, data packets can have different packet types. The types of data packets include L2 packets, L3 packets, Multi-Protocol Label Switching (MPLS) packets, and other types of packets. Under the conventional mode, for example, for a L2 data packet, the forwarding table is a forwarding database (FDB) table. The FDB table is a correspondence table of ports, media access control (MAC) addresses and virtual local area network (VLAN) in the routing switch device. When the routing switch device receives a frame of data, the routing switch device determines whether to filter or forward the frame of data based on its own FDB table.

In one embodiment, for a L3 data packet, the forwarding table comprises a routing table. The routing table stores a path directing to a specific network address. Under some circumstances, it also stores the routing measurement value of the path. The routing table contains topology information of network surroundings. One task of a router is to find a best transmission path for each data packet passing through the router, and transmit the data to the destination effectively. In addition, there are often other tables that coordinate with the routing table to process the L3 data packet.

In one embodiment, for a multiprotocol label switching (MPLS) packet, some forwarding tables (such as an FDB table, a routing table with labels, a tunnel label table, and so on) are also used to process the data packet.

In one embodiment, for other data packets, an Access Control List (ACL) can be used as the forwarding table. In one embodiment, such an ACL is used in the conventional routing switch device to process packets other than normal L2/L3 data flows. For example,an ACL rule is used to forward the protocol control packet to the CPU through the ACL or to discard a special flow. It is possible to deny or allow communication of some Internet Protocol (IP) or IPs within some range. For example, if the ACL is designated to a certain port, then it is possible to specify whether to deny the IP through that port.

In one embodiment, using the above several forwarding tables under the conventional mode, the routing switch device can forward the received packet to an appropriate destination address.

Figure 2:
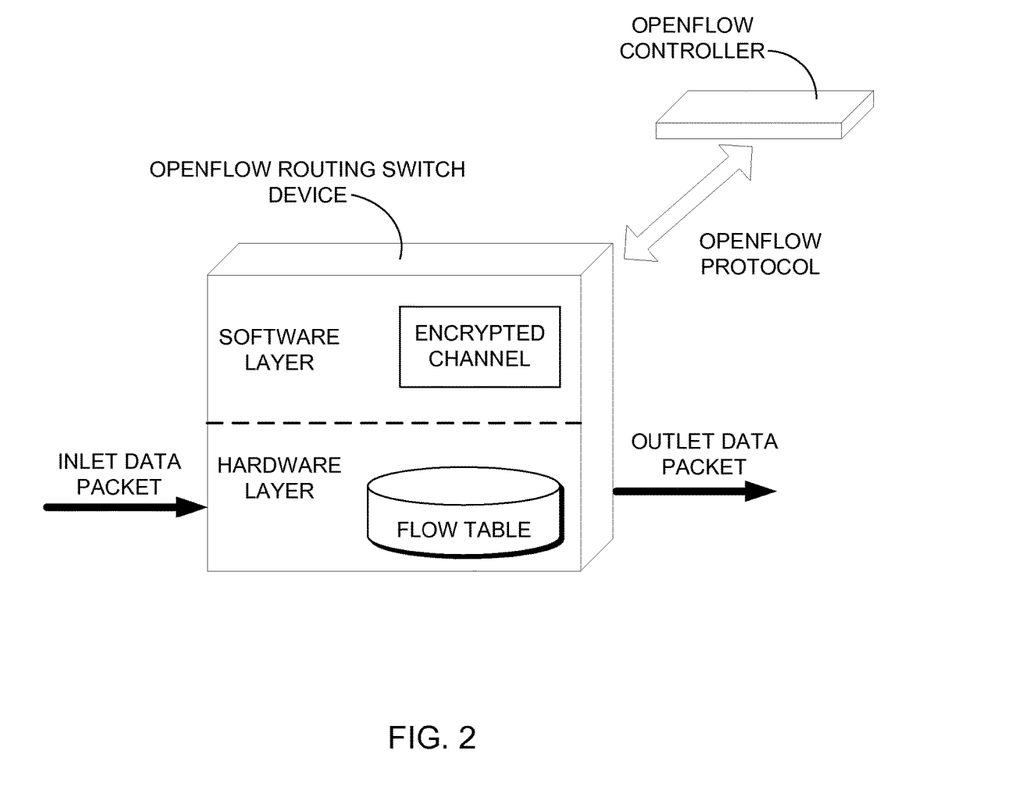
FIG. 2 shows a communication framework of a routing switch device and a controller supporting the OpenFlow protocol, in accordance with an exemplary embodiment of the present invention.

FIG. 2 shows a communication framework of the routing switch device and the controller supporting the OpenFlow protocol, in accordance with one embodiment. According to FIG. 2, under the OpenFlow communication framework, the process of forwarding and the process of controlling the routing switch device are separated. The routing switch device is responsible for the functions such as the forwarding and the packets required by the data plane. In one embodiment, the protocol control process is handled by a centralized controller. In one such embodiment, communications between the routing switch device and such a centralized controller is transmitted in an encrypted channel by using the OpenFlow protocol. In one embodiment, in the hardware level of the routing switch device, several flow tables are configured for storing rules related to the packet forwarding and policy control. In one embodiment, rules related to the packet forwarding process and policy control in the flow tables are computed by such a centralized controller according to users' configuration or protocols, and are transmitted to the routing switch device through an encrypted channel.

In various embodiments, the flow table includes a set of a series of flow table items. The OpenFlow specification defines standard protocol fields supported by the flow table item. In one embodiment, each flow table item contains the following three pieces of information:

1) Match fields: which fields of the packet header need to be matched, such as source/destination MAC address, VLAN ID, VLAN priority, source/destination IP address, DSCP, IP protocol number, TCP/UDP source/destination port number, etc. One OpenFlow specification (openflow-spec-v1.4.0) defines up to 42 different match fields. In general, a flow table has different possibilities for implementation. In one embodiment, a flow table only includes certain fields of interest, for example, only the IP 5-tuple is included. In one embodiment, a flow table also contains most of the fields defined in the OpenFlow specification.

2) Match priority: in general, in one embodiment, each flow table item is provided with a match priority. However, a given packet may match multiple flow table items in some flow table. In one embodiment, in such a case, only the action associated with the flow table item with the highest match priority is performed.

3) Associated actions: in one embodiment, after a packet matches the fields defined in a flow table item, the action associated with the flow table item is performed. The actions can include, but are not limited to, modifying the value of a specified field of the packet header, adding a new packet header, deleting some packet header, sending out the packet at some port(s), maintaining packet statistic information, and so on. In addition to these actions, other actions associated with the flow table items can be customized according to the specific implementation of the flow table.

Referring now to FIG. 2, a communication framework of a routing switch device and a controller supporting the OpenFlow protocol are illustrated. In the illustrated embodiment, the OpenFlow routing switch device is configured for operations such as parsing, matching and executing on packets. In one such embodiment after the inlet data packet is parsed, all the fields in the packet header are parsed and then looked up in the flow table storing flow table items to determine if the packet matches a flow table item therein. In the illustrated embodiment, if it matches some flow table item, then the corresponding action in the flow table item is performed.

Figure 3:
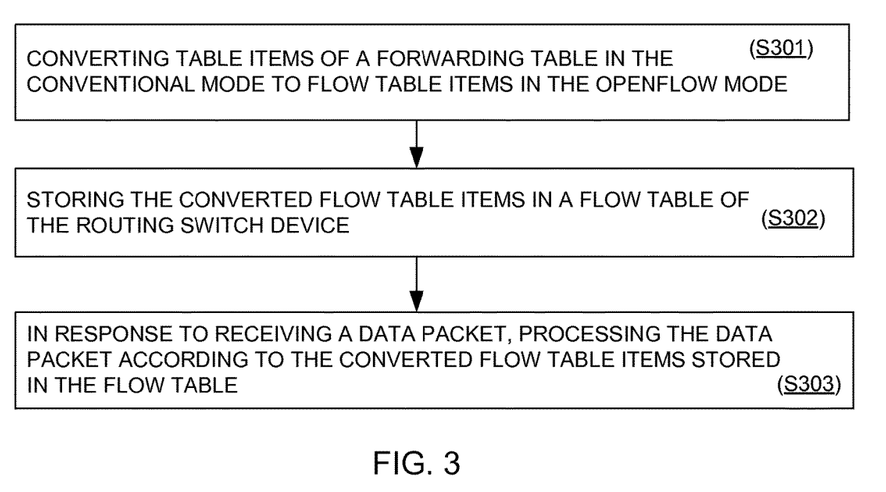
FIG. 3 schematically shows operations of a method for use by the routing switch device according to one embodiment of the present disclosure, in accordance with an exemplary embodiment of the present invention.

FIG. 3 schematically shows operations of a method for use by a routing switch device according to one embodiment of the present disclosure. According to FIG. 3, in response to the routing switch device being to switch from a conventional mode to an OpenFlow mode, the following operations are performed: at operation S301, converting table items of a forwarding table in the conventional mode to flow table items in the OpenFlow mode; at operation S302, storing the converted flow table items in a flow table of the routing switch device; and at operation S303, in response to receiving a data packet, processing the data packet according to the converted flow table items stored in the flow table.

In one embodiment, once the protocol layer converges, the OpenFlow controller forms new flow table items and send them to the routing switch device. Therefore, in one such embodiment, the method shown in FIG. 3 also comprises two additional operations (not shown in FIG. 3) that are described hereafter: in one operation, in response to receiving new flow table items from an OpenFlow controller, updating the converted flow table items stored in the flow table using the new flow table items; and in the other operation, in response to receiving a new data packet, processing the new data packet according to the new flow table items stored in the flow table. In other words, in such an embodiment, once the OpenFlow controller gives new flow table items, the new flow table items are used to process received data packets and the converted flow table items are not.

In various embodiments, for scenario 1 and scenario 2 in Table 1, it is possible to request the routing switch device to switch from the conventional mode to the OpenFlow mode.

In particular, scenario 1 is to switch from the standalone mode to the OpenFlow mode. Therefore, in one embodiment, in response to the routing switch device being to switch from a conventional mode to an OpenFlow mode comprises in response to the routing switch device being to switch from a standalone mode to the OpenFlow mode. In particular, in one embodiment, for such a request, the routing switch device receives a command which requests it to be activated as the OpenFlow mode from the standalone mode, and then the routing switch device determines that it needs to switch from the standalone mode to the OpenFlow mode. Therefore, in one embodiment, the routing switch device switching from the conventional mode to the OpenFlow mode begins with the routing switch device being activated in the OpenFlow mode, e.g., switched from the standalone mode to the OpenFlow mode.

In one embodiment, after activation, once the routing switch device establishes connection with the OpenFlow controller, the routing switch device enters the OpenFlow mode. As mentioned previously, in some solutions, it can be challenging to process received data packets before the flow table items sent from the OpenFlow controller are obtained. In one embodiment, the routing switch device performs the operations shown in FIG. 3, such that before the flow table items (which are sent from the OpenFlow controller) are obtained, the flow table items in the OpenFlow mode (which are converted from the table items of the forwarding table in the conventional mode) are used to process received data packets, thereby maintaining the continuity of the packet processing and reducing the consumption of the CPU resources of the routing switch device.

In a further embodiment, the method shown in FIG. 3 also comprises another operation (not shown in FIG. 3) that is described hereinafter: wherein in response to the conversion of converting table items of a forwarding table in the conventional mode to flow table items in the OpenFlow mode being completed, the routing switch device establishes a connection with the OpenFlow controller and sends the converted flow table items to the OpenFlow controller. In other words, once the routing switch device establishes the connection with the OpenFlow controller, the routing switch device enters the OpenFlow mode. At this time, the Open- Flow controller computes new flow table items internally based on the global topology information and the protocol. If the convergence of the protocol layer is slower than establishing connection, then establishing completely new flow table items would cause the routing switch device to process received data packets differently. Therefore, in one embodiment, the converted flow table items can be sent to the OpenFlow controller when the connection is established, such that the OpenFlow controller uses the originally converted flow table items as reference to generate new flow table items. In other words, the new flow table items are generated according to the converted flow table items. In such embodiments, it is therefore possible to determine whether to preserve, update or delete the converted flow table items at the OpenFlow controller side to amend the flow table items in the routing switch device as the new flow table items. Such an updating approach can refer to each item of the flow table items specifically. Therefore, in some embodiments, it is possible to update at least one field among the match fields of the flow table items, or update the actions to be performed after a field is matched. In one embodiment, before the protocol converges, such processing of the OpenFlow controller does not influence the routing switch device normally forwarding original known data flow. In one such embodiments, the normal forwarding is also performed using the converted flow table items. In some such embodiments, in the case that there is existing traffic, it is possible to release CPU resources of the routing switch device and the OpenFlow controller, ensuring the non-interrupted forwarding of the existing traffic. In addition, in some embodiments, the flow table processing of the Open-Flow controller can increase the convergence rate of the OpenFlow protocol layer. How to realize the OpenFlow controller specifically is not limited in the protection scope of the present disclosure.

In general, scenario 2 includes a switch from the fail standalone mode to the OpenFlow mode. Therefore, in one embodiment, the routing switch device being to switch from the conventional mode to the OpenFlow mode comprises switching from the fail standalone mode to the OpenFlow mode. In one embodiment, in the fail standalone mode, the OpenFlow mode of the routing switch device has been activated, but the connection with the OpenFlow controller is lost. Therefore, such a switching from the fail standalone mode to the OpenFlow mode begins with a routing switch device that has lost its connection with the OpenFlow controller and the routing switch device establishing a new connection with the OpenFlow controller.

In one embodiment, after establishing the connection with the OpenFlow controller again, at this time, the OpenFlow controller has not established new flow table items. As mentioned in the background technology, for known solutions, it is a challenge to process received data packets before the flow table items sent from the OpenFlow controller are obtained. In the present embodiment, the routing switch device performs operations shown in FIG. 3, such that before the flow table items (sent from the OpenFlow controller) are obtained, the flow table items in the Open-Flow mode (converted from the table items of the forwarding table in the conventional mode) are used to process received data packets, thereby maintaining the continuity of the packet processing.

In a further embodiment, the method shown in FIG. 3 also comprises another operation (not shown in FIG. 3) as described hereinafter: wherein in response to a completion of the conversion of converting table items of a forwarding table in the conventional mode to flow table items in the OpenFlow mode, sending the converted flow table items to the OpenFlow controller. Then, the OpenFlow controller can operate as described in scenario 1. If there are no flow table items sent from the OpenFlow controller, the original converted flow table items are used to process input data packets to maintain the continuity of the packet processing. If there are new flow table items that were sent from the OpenFlow controller, then those new flow table items are used to process input data packets. Therefore, in one such further embodiment, the new flow table items are generated according to the converted flow table items.

Returning now to FIG. 3, in one embodiment, concerning the operation S301, for the implementation of the converting table items of a forwarding table in the conventional mode to flow table items in the OpenFlow mode, in particular, the forwarding tables in the conventional mode include a FDB table, a routing table, an ARP table and a layer-three port information table, and so on. However, the flow table items are matched with different input packet types practically, such as L2 packets, L3 packets, MPLS packets and so on. In conventional forwarding, one forwarding procedure may refer to the table items of multiple forwarding tables. Therefore, in some embodiments, during the procedure of converting to flow table items, for a certain type of data packet, it is possible to concatenate corresponding table items of at least one forwarding table in the conventional mode corresponding to the type of data packet to form one flow table item corresponding to the type of data packet. In the following discussion, the converting approaches for various types of data packets are described respectively.

In one embodiment, the L2 packet is classified into L2 unicast and L2 multicast. In one such embodiment, for conventional forwarding, only a FDB table is needed. During the converting procedure, for a certain FDB table item, the MAC address and the VLAN in the FDB table item is extracted as the destination MAC address (DMAC) and the VLAN in the match fields of the converted flow table item, and the port in the FDB table item is extracted as the outlet port in the action associated with the flow table item to form one flow table item. The meaning of the associated action is to forward the data packet to the specified outlet port. In the following, the meaning of the match field (Match) is a field that input packets are required to match; the meaning of all the associated actions (Action) is to perform related actions on the matched input packets based on the rules specified in the Action, which will not be described repeatedly later.

For example, if the input data packet is L2 unicast, then the FDB table before conversion is shown in Table 2:

TABLE 2

| MAC address | VLAN | port number |
|---|---|---|
| fc:cf:62:9d:92:13 | 5 | 21 | the converted flow table item is shown in Table 3:

TABLE 3

Flow1 Match: DMAC= fc:cf:62:9d:92:13 VLAN ID=5 //representing that the match fields are the destination MAC address equal to fc:cf:62:9d:92:13, and VLAN equals to 5.
ACTION: port=21 //representing that the associated action is to forward the packet out at the number 21 port.

Wherein, the match fields are given after Match, and the associated action is given after ACTION. All flow table items generated subsequently have the same meaning, which will not be described repeatedly again. The words after the symbol "//" are remarks.

For example, if the input data packet is L2 multicast, then the FDB table before conversion is shown in Table 4:

TABLE 4

| MAC address | VLAN | port number |
|---|---|---|
| 01 00 00 00 00 01 | 5 | 21, 22 | the converted flow table item is shown in Table 5:

TABLE 5

Flow1 Match : DMAC= 01 00 00 00 00 01 VLAN ID=5
ACTION: port=21, 22.

In one embodiment, the L3 packet is classified into L3 unicast and L3 multicast. In one such embodiment, for conventional forwarding, a routing table, an ARP table, a FDB table and so on are needed. In one embodiment, in the procedure of converting to the flow table item (for both L3 unicast packets and L3 multicast packets) a search is performed for the above multiple table items, and the forwarding is finally performed according to the routing rules. However, different flow table items would be formed for given L3 unicast packets and L3 multicast packets.

In one embodiment, for processing a L3 unitcast packet, a FDB table, a routing table, an ARP table and a layer-tree port information table are needed. The conversion procedure includes: first searching the FDB table to obtain the present device's MAC address and VLAN as the destination MAC address (DMAC) and the VLAN of the match fields; searching the routing table to obtain a destination IP address and a mask as the destination IP address and the mask (DIP/MASK) of the match fields; taking the next hop address in the routing table as the IP address to index the ARP table items to obtain a MAC address, a VLAN and a physical outlet port as the destination MAC address (DMAC), the VLAN and the physical outlet port (port) in the action to be performed; and indexing the layer-three port information table by the layer-three outlet ports in the routing table to obtain a MAC address as the source MAC address (SMAC) in the action to be performed. In one embodiment, all the match fields and the actions to be performed are combined as one flow table item.

For example, before conversion, the routing table item is as follows in Table 5:

TABLE 6

| Destination IP address | Mask | Next hop | Layer-three outlet port (interface) |
|---|---|---|---|
| 9.110.40.0 | 255.255.255.0 | 192.168.49.50 | 1 |

The ARP table item is as follows in Table 7:

TABLE 7

| IP address | Mark | MAC address | VLAN | Physical outlet port |
|---|---|---|---|---|
| 192.168.49.50 | P | fc:cf:62:9d:92:00 | 3 | 4 |

The table item of layer-three port information table is as follows in Table 8:

TABLE 8

| Layer-three outlet port | MAC address | VLAN |
|---|---|---|
| 1 | 00:01:01:01:ee:ee | 3 |

The present device's table item of the FDB is as follows in Table 9:

TABLE 9

| MAC address | VLAN |
|---|---|
| 00:01:01:01:ee:ee | 2 |

The converted flow table item is as shown in table 10:

TABLE 10

FLOW: Match DMAC=00:01:01:01:ee:ee, VLAN=2,
DIP/MASK=9.110.40.0/255.255.255.0
Action DMAC=fc:cf:62:9d:92:00, SMAC=00:01:01:01:ee:ee, VLAN=3, port=4.

In one embodiment, for the conversion of a L3 multicast packet, a multicast routing table and a layer-tree port information table are needed. The conversion procedure includes: searching table items of the multicast routing table to obtain a destination IP address, a source IP address, a VLAN as the destination IP address (DIP), the source IP address (SIP) and the VLAN of the match fields. In some embodiments and scenarios, the multicast destination IP address (DIP) has a many-to-one relationship with the destination MAC address (DMAC) as a match field, and it is possible to directly calculate the destination MAC address (DMAC) needing to be matched trough the destination IP address (DIP). In one such embodiment, the layer-three outlet ports in the multicast routing table items is searched to index the layer-three port information table to obtain a MAC address, a VLAN and a physical outlet port as the source MAC address (SMAC), e.g., the VLAN and the physical outlet port in the action to be performed. In one such embodiment, all the match fields and the actions to be performed are combined as one flow table item.

For example, before the conversion, the table item of the multicast routing table is shown in Table 11:

TABLE 11

| Destination IP address | Source IP address | VLAN | Layer-three outlet port |
|---|---|---|---|
| 224.0.0.1 | 192.168.0.1 | 2 | 1, 2, 3 |

The table item of the IP interface information table is shown in Table 12:

TABLE 12

| Layer-three outlet port | MAC Address | VLAN | Port |
|---|---|---|---|
| 1 | 00:01:01:01:01:01 | 3 | 3 |
| 2 | 00:01:01:01:01:02 | 4 | 4 |
| 3 | 00:01:01:01:01:03 | 5 | 5 |

The converted flow table item is shown in Table 13:

TABLE 13

Flow: Match: DMAC(01:00:5e:00:00:01), VLAN = 2, DIP = 224.0.0.1,
SIP = 192.168.0.1
Action:   SMAC = 00:01:01:01:01:01, VLAN_3, port = 3
          SMAC = 00:01:01:01:01:02, VLAN_4, port = 4
          SMAC = 00:01:01:01:01:03, VLAN_5, port = 5.

In one embodiment, the MPLS packet is classified into MPLS-PUSH packet and MPLS-POP packet. In one such embodiment, for a MPLS-PUSH packet, a FDB table, a routing table with labels, a tunnel label table, an ARP table and a layer-three outlet port information table are needed. The conversion procedure includes: searching the FDB table to obtain the present device's MAC address and VLAN as the destination MAC address (DMAC) and the VLAN of the match fields; searching the routing table with labels to obtain a destination IP address/mask information as the destination IP address and the mask (DIP/MASK) of the match fields; then taking the destination IP address as an index to search the routing table with labels; taking the searched tunnel number as an index to search the tunnel label table to obtain a label number and a lay-three outlet port information, and taking the label number as the label number (MPLS label) in the action to be performed; taking the searched layer-three outlet port as an index to search the layer-three outlet port information table to obtain a MAC address as the source MAC address (SMAC) in the action to be performed; taking the searched label number as an index to search the Address Resolution Protocol (ARP) table to obtain a MAC address and a physical port number as the destination MAC address (DMAC) and the physical outlet port in the action to be performed, which are combined as one flow table item.

For example, before conversion, the present device's table item of the FDB table is shown in Table 14:

TABLE 14

| MAC address | VLAN |
| --- | --- |
| 00:01:01:01:01:01 | 2 |

The table item of the routing table with labels is shown in Table 15:

TABLE 15

| Destination IP address | Mask | Tunnel number |
| --- | --- | --- |
| 9.110.40.0 | 255.255.255.0 | 100 |

The table item of the tunel label table is shown in Table 16:

TABLE 16

| Tunnel number | Label number | Layer-three outlet port |
| --- | --- | --- |
| 100 | 1000 | 1 |

The table item of the ARP table is shown in Table 17:

TABLE 17

| Label number | MAC address | Physical outlet port |
| --- | --- | --- |
| 1000 | fc:cf:62:9d:92:00 | 3 |

The table item of the layer-three outlet port information table is shown in Table 18:

TABLE 18

| Layer-three outlet port | MAC address |
| --- | --- |
| 1 | 00:01:01:01:01:01 |

The converted flow table item is shown in Table 19:

TABLE 19

Flow: Match: VLAN = 2, DMAC = 00:01:01:01:01:01,
DIP = 9.110.40.0/255.255.255.0
Action: Push MPLS label = 1000, Pop VLAN,
SMAC = 00:01:01:01:01:01, DMAC = fc:cf:62:9d:92:00,
port = 3.

In one embodiment, for a POP packet in the MPLS packet, a FDB table, a routing table with labels, a tunnel label table, an ARP table and a layer-three outlet port information table are needed. The conversion procedure includes: searching the FDB table to obtain the present device's MAC address as the destination MAC address (DMAC) of the match fields; searching the routing table with labels to obtain a label number and a layer-three outlet port, and taking the searched label number as the label number (MPLS Label) in the match fields. In one embodiment, the searched layer-three outlet port is used as an index for the port numbers to search the layer-three port information table to obtain a MAC address and a VLAN as the source MAC address (SMAC) and the VLAN in the action to be performed. The searched label number is used as an index to search the ARP table to obtain a MAC address and a physical outlet port as the destination MAC address (DMAC) and the physical outlet port in the action to be performed. In one embodiment, all the match fields and the actions to be performed are combined as one flow table item.

For example, before the conversion, the present device's table item of the FDB table is: MAC=00:01:01:01:01:01

The table item of the routing table with labels is shown in Table 20:

TABLE 20

| Label number | Layer-three outlet port |
| --- | --- |
| 1000 | 1 |

The table item of the ARP table is in Table 21:

TABLE 21

| Label number | MAC address | Physical outlet port |
| --- | --- | --- |
| 1000 | fc:cf:62:9d:92:00 | 3 |

The table item of the layer-three outlet port information table is shown in Table 22:

TABLE 22

| Layer-three outlet port | MAC address | VLAN |
|---|---|---|
| 1 | 00:01:01:01:01:01 | 3 |

The converted flow table item is shown in Table 23:

TABLE 23

Match: MPLS Label = 1000, DMAC = 00:01:01:01:01:01
Action: Pop MPLS, Push VLAN = 3, SMAC = 00:01:01:01:01:01, DMAC = fc:cf:62:9d:92:00, port = 3.

In one embodiment, for other types of packets such as the packet needing to use the Access Control List (ACL), each table item of the ACL table exists independently and can correspond to the flow table directly, and it comprises fields to be matched and the action to be performed. As such, it is possible to take the match fields in the ACL as the fields to match in the flow table item, and take the action to be performed in the ACL as the action to be performed in the flow table item to form on flow table item.

For example, the table item of the ACL table is shown in Table 24:

TABLE 24

Match: vlan = 100, DMAC = 00:01:01:01:01:01, DIP = 1.1.1.1
Action: port = 3,

The coverted flow tabel item is shown in table 25:

TABLE 25

FLOW: Match: vlan = 100, DMAC = 00:01:01:01:01:01, DIP = 1.1.1.1
Action: port = 3.

Figure 4:
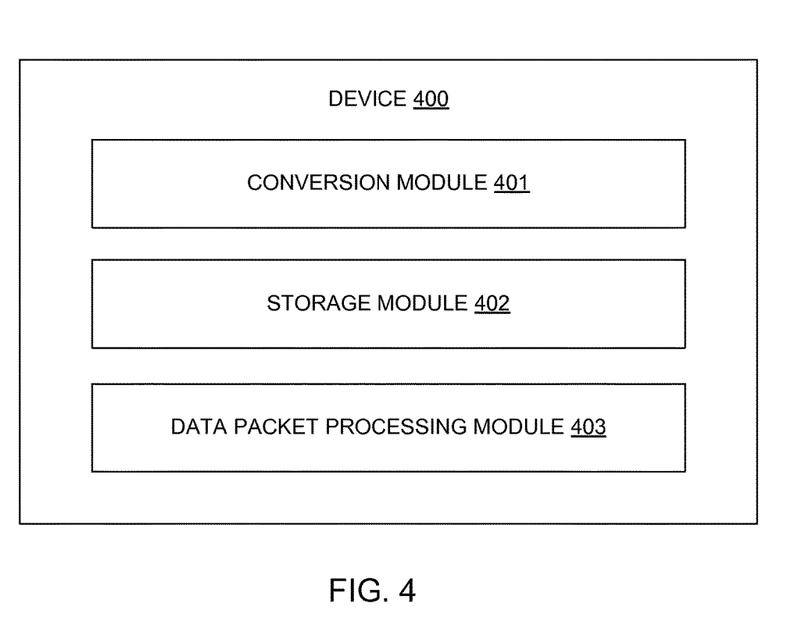
FIG. 4 schematically shows a structural block diagram of a device 400 for use by the routing switch device, in accordance with an exemplary embodiment of the present invention.

In one embodiment, under the same inventive concept, the present disclosure also provides a device for use by a routing switch device. FIG. 4 shows a structural block diagram of device 400 for use by a routing switch device. According to FIG. 4, the device comprises: a conversion module 401 configured to, in response to the routing switch device being to switch from a conventional mode to an OpenFlow mode, convert table items of a forwarding table in the conventional mode to flow table items in the OpenFlow mode; a storage module 402 configured to store the converted flow table items in a flow table of the routing switch device; and a data packet processing module 403 configured to, in response to receiving a data packet, process the data packet according to the converted flow table items stored in the flow table.

In one embodiment, the device further comprises (not shown in FIG. 4): a replacement module configured to, in response to receiving new flow table items from an OpenFlow controller, update the converted flow table items stored in the flow table using the new flow table items. And the data packet processing module is also configured to, in response to receiving a new data packet, process the new data packet according to the new flow table items stored in the flow table.

In one embodiment, the conversion module is further configured to, for a certain type of data packet, concatenate corresponding table items of at least one forwarding table in the conventional mode corresponding to the type of data packet to form one flow table item corresponding to the type of data packet. Here, the types of the data packet include a L2 packet, a L3 packet, a Multi-Protocol Label Switching packet, and other types of packets.

In one embodiment, switching from a conventional mode to an OpenFlow mode comprises switching from a standalone mode to the OpenFlow mode, and switching from the standalone mode to the OpenFlow mode begins with the routing switch device being activated in the OpenFlow mode. In a further embodiment, the device further comprises (not shown in FIG. 4): a connection establishing and transmitting module configured to, in response to the conversion of converting table items of a forwarding table in the conventional mode to flow table items in the OpenFlow mode being completed, establish connection with the OpenFlow controller and send the converted flow table items to the OpenFlow controller. In one embodiment, the new flow table item is generated according to the converted flow table items.

In one embodiment, switching from a conventional mode to an OpenFlow mode comprises switching from a fail standalone mode to the OpenFlow mode, and switching from the fail standalone mode to the OpenFlow mode begins with a routing switch device (that has lost connection with the OpenFlow controller) establishing another connection with the OpenFlow controller. In a further embodiment, the device further comprises (not shown in FIG. 4): a transmitting module configured to, in response to the conversion of converting table items of a forwarding table in the conventional mode to flow table items in the OpenFlow mode being completed, send the converted flow table items to the OpenFlow controller. In a further embodiment, the new flow table item is generated according to the converted flow table items.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transitioning a routing switch device from a conventional mode to an OpenFlow mode, comprising:
    initiating, by a routing switch device, a switch from a conventional mode to an OpenFlow mode;
    converting, by the routing switch device, table items of a forwarding table generated by the routing switch device in the conventional mode to converted flow table items to be used in the OpenFlow mode;
    storing, by the routing switch device, the converted flow table items in a flow table of the routing switch device;
    receiving, by the routing switch device, a data packet; and
    processing, by the routing switch device, the data packet based, at least in part, on the converted flow table items stored in the flow table.

2. The method according to claim 1, further comprising:
    generating, by an OpenFlow controller, new flow table items upon convergence of the OpenFlow protocol layer between the routing switch device and the OpenFlow controller;
    receiving, by the routing switch device, the new flow table items sent from the OpenFlow controller;
    replacing, by the routing switch device, the converted flow table items stored in the flow table with the new flow table items sent from the OpenFlow controller;
    receiving, by the routing switch device, a new data packet; and
    processing, by the routing switch device, the new data packet according to the new flow table items.

3. The method according to claim 1, wherein converting the table items of the forwarding table in the conventional mode to the converted flow table items to be used in the OpenFlow mode comprises:
for a certain type of data packet, concatenating, by the one or more processors, corresponding table items of at least one forwarding table in the conventional mode corresponding to the type of data packet to form a flow table item corresponding to the type of data packet.

4. The method according to claim 3, wherein types of data packets include at least one of an L2 packet, an L3 packet, and a Multi-Protocol Label Switching packet.

5. The method according to claim 1, wherein initiating, by the routing switch device, the switch from the conventional mode to the OpenFlow mode comprises:
receiving, by the routing switch device, a command to activate the OpenFlow mode; and
initiating the switch, by the routing switch device, from a standalone mode to the OpenFlow mode.

6. The method according to claim 5, further comprising:
responsive to completing, by the routing switch device, the conversion of the table items of the forwarding table in the conventional mode to the converted flow table items to be used in the OpenFlow mode:
establishing, by the routing switch device, a connection with the OpenFlow controller;
enabling, by the routing switch device, the OpenFlow mode; and
sending, by the routing switch device, one or more of the converted flow table items to the OpenFlow controller.

7. The method according to claim 6, wherein the new flow table items are generated by the OpenFlow controller according to the one or more converted flow table items sent by the routing switch device.

8. The method according to claim 1, wherein initiating, by the routing switch device, the switch from the conventional mode to the OpenFlow mode comprises:
losing a first connection between the routing switch device and the OpenFlow controller;
establishing a second connection between the routing switch device and the OpenFlow controller; and
initiating the switch, by the routing switch device, from a fail standalone mode to the OpenFlow mode.

9. The method according to claim 8, further comprising:
responsive to completing, by the routing switch, the conversion of the table items of the forwarding table in the conventional mode to the converted flow table items to be used in the OpenFlow mode:
sending, by the routing switch device, one or more of the converted flow table items to the OpenFlow controller.

10. The method according to claim 9, wherein the new flow table items are generated by the OpenFlow controller according to one or more of the converted flow table items sent by the routing switch device.

11. A computer program product for transitioning a routing switch device from a conventional mode to an OpenFlow mode, the computer program product comprising:
a computer readable storage medium and program instructions stored on the computer readable storage medium, the program instructions comprising:
program instructions to initiate, by a routing switch device, a switch from a conventional mode to an OpenFlow mode;
program instructions to convert, by the routing switch device, table items of a forwarding table generated by the routing switch device in the conventional mode to converted flow table items to be used in the OpenFlow mode;
program instructions to store, by the routing switch device, the converted flow table items in a flow table of the routing switch device;
program instructions to receive, by the routing switch device, a data packet; and
program instructions to process, by the routing switch device, the data packet based, at least in part, on the converted flow table items stored in the flow table.

12. The computer program product of claim 11, further comprising:
program instructions to generate, by an OpenFlow controller, new flow table items upon convergence of the OpenFlow protocol layer between the routing switch device and the OpenFlow controller;
program instructions to receive, by the routing switch device, the new flow table items sent from the OpenFlow controller;
program instructions to replace, by the routing switch device, the converted flow table items stored in the flow table with the new flow table items sent from the OpenFlow controller;
program instructions to receive, by the routing switch device, a new data packet; and
program instructions to process, by the routing switch device, the new data packet according to the new flow table items stored in the flow table.

13. The computer program product of claim 1, wherein the program instructions to initiate, by the routing switch device, the switch from the conventional mode to the OpenFlow mode comprise:
program instructions to receive, by the routing switch device, a command to activate the OpenFlow mode; and
program instructions to initiate the switch, by the routing switch device, from a standalone mode to the OpenFlow mode.

14. The computer program product according to claim 13, further comprising:
responsive to completing, by the routing switch device, the conversion of the table items of the forwarding table in the conventional mode to the converted flow table items to be used in the OpenFlow mode:
program instructions to establish, by the routing switch device, a connection with the OpenFlow controller;
program instructions to enable, by the routing switch device, the OpenFlow mode; and
program instructions to send, by the routing switch device, one or more of the converted flow table items to the OpenFlow controller.

15. The computer program product according to claim 14, wherein the new flow table items are generated by the OpenFlow controller according to one or more of the converted flow table items sent by the routing switch device.

16. A computer system for transitioning a routing switch device from a conventional mode to an OpenFlow mode, the computer system comprising:
one or more computer processors;
one or more computer readable storage media;
computer program instructions, the computer program instructions being stored on the one or more computer readable storage media for execution by the one or more computer processors; and
the computer program instructions comprising instructions to:

initiate, by a routing switch device, a switch from a conventional mode to an OpenFlow mode;

convert, by the routing switch device, table items of a forwarding table generated by the routing switch device in the conventional mode to converted flow table items to be used in the OpenFlow mode;

store, by the routing switch device, the converted flow table items in a flow table of the routing switch device;

receive, by the routing switch device, a data packet; and process, by the routing switch device, the data packet based, at least in part, on the converted flow table items stored in the flow table.

17. The computer system of claim 16, further comprising program instructions to:

generate, by an OpenFlow controller, new flow table items upon convergence of the OpenFlow protocol layer between the routing switch device and the OpenFlow controller;

receive, by the routing switch device, the new flow table items sent from the OpenFlow controller;

replace, by the routing switch device, the converted flow table items stored in the flow table with the new flow table items sent from the OpenFlow controller;

receive, by the routing switch device, a new data packet; and process, by the routing switch device, the new data packet according to the new flow table items stored in the flow table.

18. The computer system according to claim 16, wherein the program instructions to initiate, by the routing switch device, the switch from the conventional mode to the OpenFlow mode comprise:

losing a first connection between the routing switch device and the OpenFlow controller;

establishing a second connection between the routing switch device and the OpenFlow controller; and initiating, by the routing switch device, the switch from a fail standalone mode to the OpenFlow mode.

19. The computer system of claim 18, further comprising:

responsive to completing, by the routing switch, the conversion of the table items of the forwarding table in the conventional mode to the converted flow table items to be used in the OpenFlow mode:

program instructions to send, by the routing switch device, one or more of the converted flow table items to the OpenFlow controller.

20. The computer system according to claim 19, wherein the new flow table items are generated by the OpenFlow controller according to one or more of the converted flow table items sent by the routing switch device.

* * * * *